United States Patent
Bubb et al.

(10) Patent No.: US 8,905,804 B2
(45) Date of Patent: Dec. 9, 2014

(54) SECTIONAL HOSE FLOAT

(76) Inventors: Graham George Bubb, Aptos, CA (US); Peter Gates Morin, San Jose, CA (US)

(*) Notice: Subject to any disclaimer, the term of this patent is extended or adjusted under 35 U.S.C. 154(b) by 0 days.

(21) Appl. No.: 12/894,108

(22) Filed: Sep. 29, 2010

(65) Prior Publication Data

US 2011/0079312 A1    Apr. 7, 2011

Related U.S. Application Data

(60) Provisional application No. 61/278,193, filed on Oct. 1, 2009.

(51) Int. Cl.
   *B63B 22/00*     (2006.01)
   *F16L 1/24*      (2006.01)

(52) U.S. Cl.
   CPC ..................................... *F16L 1/24* (2013.01)
   USPC ........................................................ 441/133

(58) Field of Classification Search
   USPC ........................................................ 441/133
   IPC ............................................................ B63C 9/00
   See application file for complete search history.

(56) References Cited

U.S. PATENT DOCUMENTS

| | | | |
|---|---|---|---|
| 2,395,892 A | | 3/1946 | Lontz |
| 3,170,180 A | | 2/1965 | Winston et al. |
| 3,237,221 A | * | 3/1966 | Thomson ............... 441/133 |
| 3,332,093 A | | 7/1967 | Skinner et al. |
| 4,188,679 A | * | 2/1980 | Hollaender et al. ........ 441/133 |
| 4,386,919 A | | 6/1983 | Kadono |
| 5,197,912 A | | 3/1993 | Lengefeld |
| 5,330,378 A | | 7/1994 | Park |
| 5,921,013 A | | 7/1999 | Kaczynski, Sr. |
| 6,263,823 B1 | * | 7/2001 | Olivier ............... 114/245 |
| 6,270,387 B1 | | 8/2001 | Nesheim |
| 6,887,186 B2 | * | 5/2005 | Bambanian ............... 482/55 |
| 7,100,641 B2 | | 9/2006 | Tyrer et al. |
| 7,749,035 B2 | * | 7/2010 | Oram et al. ............ 441/133 |
| 2006/0022103 A1 | * | 2/2006 | Boulard ............... 248/298.1 |

* cited by examiner

*Primary Examiner* — Stephen Avila
(74) *Attorney, Agent, or Firm* — HM Law Group LLP; Vani Moodley, Esq.

(57) ABSTRACT

The present invention is directed to a replaceable flotation device for providing buoyancy to a flexible hose. The device generally comprises two or more buoyancy members for surrounding said hose, said buoyancy members are operably connected as an assembly which can be easily replaced or repositioned along a length of the hose.

8 Claims, 3 Drawing Sheets

SECTIONAL HOSE FLOAT

BACKGROUND

Various applications exist where it is desirable to float portions of a hose that is to be submersed in a liquid medium. Where the hose is to deliver air or liquid in, to, or through said medium, there is benefit to have such hose, or portions thereof, being buoyant. Such buoyancy can alleviate, mitigate, or prevent the hose from becoming entangled either on itself or other objects that are also within the liquid environment. In addition, the buoyancy of said hose can aid in the movement or placement thereof in particular desired locations.

In one particular application, hose flotation devices have proven useful for the operation of both surface skimmers and submersible cleaning devices in swimming pools. In this application, the skimmers or cleaning devices are directly or indirectly attached to a pump through a hose or line whereby water is provided under pressure to drive the mechanism(s) of the skimmers or cleaning device. Alternatively these skimmers or submersible cleaning devices may operate by virtue of a vacuum or negative pressure provided by said pump through said hose. Depending upon the size and depth of the swimming pool, the hose or line may be of varying length and size. In addition, the hose or a portion thereof is comprised of a flexible elastomeric material thereby enabling the tethered skimmer or submersible cleaning device to move somewhat freely within the swimming pool. The hose floats that are currently available for this application typically comprise a one piece unit molded or formed to include an aperture through which the hose must pass. The aperture is typically of a diameter that is equivalent to or slightly smaller than that of the hose such that these floats may be moved or slid to a desired location along a length of the hose. In addition, these floats are generally comprised of an inflexible or non-pliable material such as a hard plastic, polymer, or wood. Installation of such floats therefore requires detachment of the pool hose from either the skimmer or submersible cleaning device whereby such hose can be threaded through the float under conditions where the hose is not pressurized or otherwise distorted. The problem with this is that the floats might slide randomly. This is not good as the spacing of the floats is important for keeping a specific portion of the hose afloat at all times.

A significant problem however arises when the floats gradually become waterlogged, lose their buoyancy, or otherwise require replacement. Contrary to their intended purpose compromised or waterlogged floats tend to cause or increase the hose's propensity to sink thereby undermining any conveyed benefit. Replacement of such hose floats has proven to be problematic requiring disassembly of the pump-hose-device assembly. Certain hoses and floats are also comprised of a material or materials that have a tendency to swell or distort from the sun or after being submersed in water for extended periods of time. In addition, typical use of the hoses to deliver pressurized liquid or gasses (air) aggravates the situation. The swelling and or distortion causes the float(s) to become locked or essentially fixed on the hose. Under such circumstances removal of the one-piece pool float from the hose is extremely difficult, often requires that the float be cut, smashed, broken or otherwise physically compromised. In the process the pool hose can easily be punctured, torn or otherwise compromised. In addition, the threading of a section of used and swollen pool hose through the center of a new existing one-piece hose float frequently proves to be a difficult and often insurmountable task, requiring extensive time, labor and cost.

BRIEF DESCRIPTION

FIG. 3 is a perspective view of two buoyancy members in assembly forming a complete operable float, showing the aperture for the hose or rope to pass through.

DETAILED DESCRIPTION

The present invention is directed to a hose float comprising two or more buoyancy members, each of said members independently comprising an inner surface for interfacing with a hose and at least one of said buoyancy members further comprising one or more protrusions on its inner surface whereby said two or more buoyancy members are operably connected such that each such inner surface can be positioned to interface with said hose.

Figure 1:
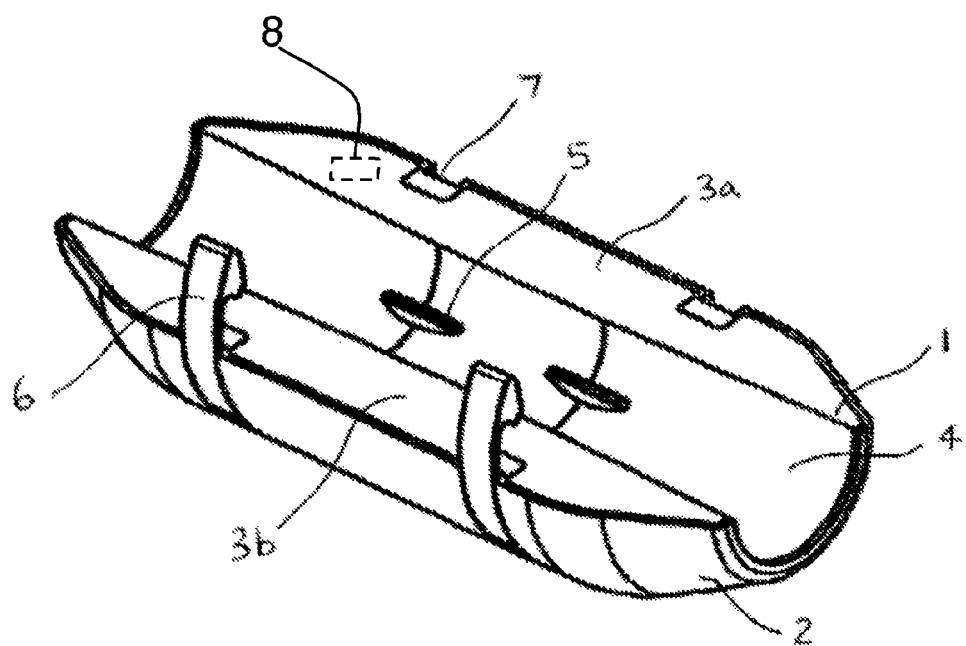
FIG. 1 is a perspective view of one buoyancy member with press fit clips being attached on the outer surface.

FIG. 1 shows a hollow chambered buoyancy member, comprising of an inner surface 1, and an outer surface 2. The inner surface consists of two flat mating surfaces 3a and 3b respectively, and a perpendicularly concaved longitudinally cylindrical surface 4, that could be tapered from its center outward or perfectly cylindrical, for mating with a hose or rope. This cylindrical surface 4, has one or more protrusions 5, for clamping the hose or rope, when in assembly, with one or more identical buoyancy members. These protrusions 5, are of a size and shape so as not to penetrate the inner diameter of the hose but sufficiently clamp the outer diameter of the hose or rope to prevent the assembled float from easily sliding along the hose or rope. The outer surface 2, is perpendicularly convex about the same center line axis as the inner cylindrical surface 4, and the hose or rope. This outer surface is hydro-dynamically shaped by having an ogive-shaped nose so that when two or more buoyancy members are in assembly about a hose or rope and in operation, there is minimal drag in the water. This outer surface 2, has one or more press fit clips 6, attached or molded to it on one side and one or more receiving apertures 7, on the other side to receive the clips when two or more buoyancy members are in assembly.

Figure 2:
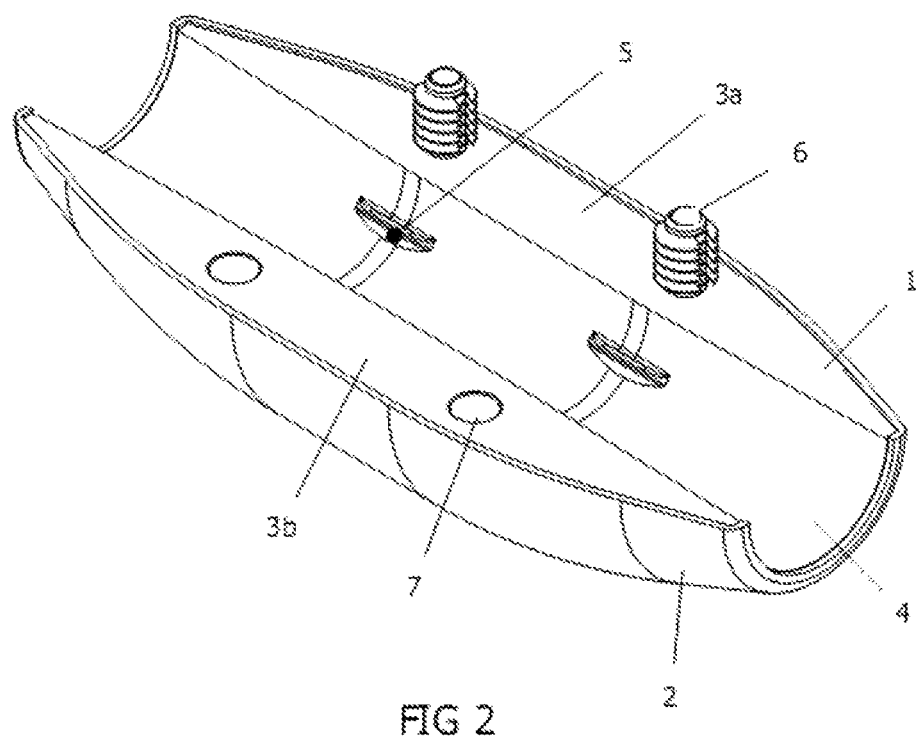
FIG. 2 is a perspective view of one buoyancy member with male/female type clips being attached on the inner mating surface.

FIG. 2 shows a different embodiment of a hollow chambered buoyancy member, comprising of an inner surface 1, and an outer surface 2. The inner surface consists of two flat mating surfaces 3a and 3b respectively, and a perpendicularly concaved longitudinally cylindrical surface 4, for mating with a hose or rope that could be tapered from its center outward or perfectly cylindrical. This cylindrical surface 4, has one or more protrusions 5, for clamping the hose or rope, when in assembly, with one or more identical buoyancy members. These protrusions 5, are of a size and shape so as not to penetrate the inner diameter of the hose but sufficiently clamp the outer diameter of the hose or rope to prevent the assembled float from easily sliding along the hose or rope. The outer surface 2, is perpendicularly convex about the same center line axis as the inner cylindrical surface 4. This outer surface is hydro-dynamically shaped so that when two or more buoyancy members are in assembly about a hose or rope and in operation, there is minimal drag in the water. This outer surface 2, has one or more male clips 6, and one or more female type receiving apertures 7, which may be on the inner mating surfaces 3a and 3b respectively. With one mating surface 3a, having one or more male clips 6, and the opposite mating surface 3b, having one or more female type receiving apertures 7, for receiving the male clips from the one or more buoyancy members when in assembly, around the hose or rope that they are keeping afloat.

In one embodiment, each buoyancy member is comprised of two or more separate pieces that surround and define an air pocket for enhancing flotation. In FIG. 1, only on air pocket has been indicated schematically by reference numeral 8. The two or more separate pieces are permanently bonded to form a watertight seal thus forming a hollow chambered buoyancy member. Preferable the two or more separate pieces are comprised of a type of plastic, ABS or other polymeric material.

Figure 3:
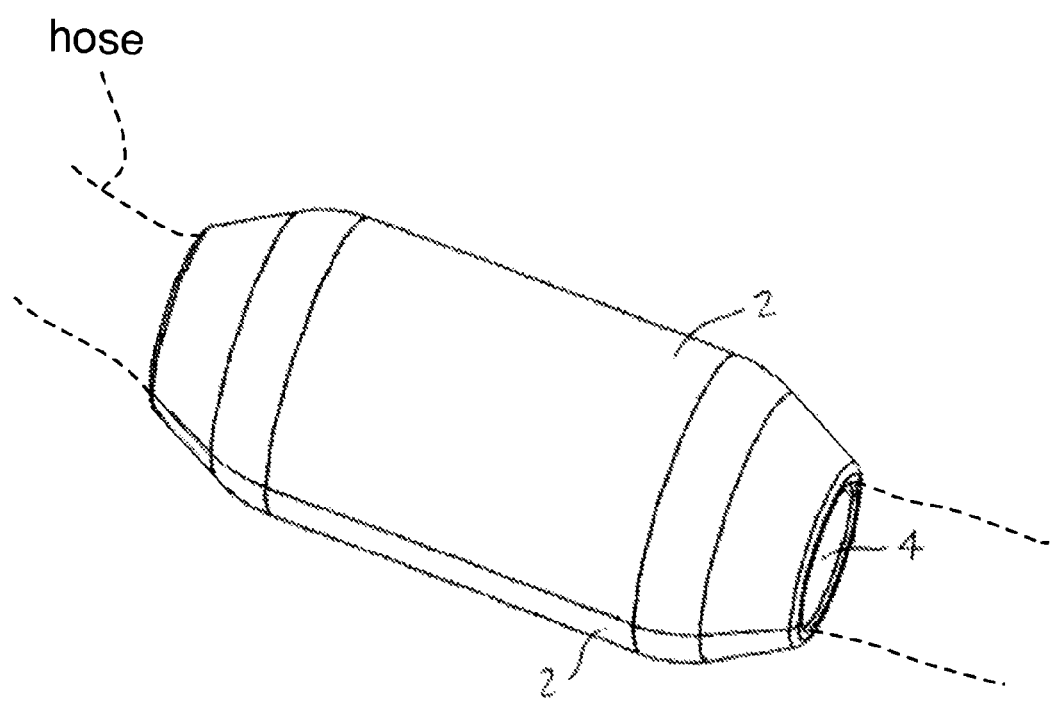

FIG. 3 when two or more buoyancy members are in assembly the convex inner cylindrical surfaces 4, forms a hole in which the hose or rope passes. When two or more buoyancy members are in assembly the outer surfaces 2, form a hydrodynamic shape so as to minimize the drag as the hose moves through the water when attached to the swimming pool cleaner.

Other methods of attaching the one or more buoyancy members but not limited to is by a hinge and latches, friction tape, elastic bands, slide fit clips and receiving apertures, glue, interference fitting members, turn buckles or tension straps.

Friction tape on the inner cylindrical surfaces may be used instead of the protrusions to prohibit the buoyancy member from easily sliding along the hose or rope.

The advantage of having a float with two or more buoyancy members is, when a float needs to be replaced, only one buoyancy member might need to be replaced at that time. This can be a substantial saving on cost of material, which intern saves on the environment by not having to discard a complete float each time.

While there has been described and pointed out features and advantages of the invention as applied to the above referenced embodiments, those skilled in the art will appreciate that various modifications, changes, additions, and omissions to the present invention as illustrated and described can be made without departing from the spirit of the invention.

We claim:

1. A float for a hose comprising:
    a first buoyancy member comprising a hollow chambered body having opposed first inner and first outer surfaces, said first inner surface defining a channel which is flanked by two flat mating surfaces, said channel for receiving a hose therein and bearing protrusions that are integral with the first inner surface and stand proud of the first inner surface, wherein the protrusions are of a size and shape so as not to penetrate an inner diameter of the hose when clamping an outer diameter of the hose;
    a second buoyancy member comprising a hollow chambered body having opposed second inner and second outer surfaces, said second inner surface defining a channel which is flanked by two flat mating surfaces, said channel for receiving said hose therein and bearing protrusions that are integral with the second inner surface and stand proud of the second inner surface, wherein the protrusions are of a size and shape so as not to penetrate an inner diameter of the hose but clamp an outer diameter of the hose; and
    fastening means for securing the first buoyancy member and the second buoyancy member together in a configuration in which each flat mating surface of the first buoyancy member abuts a corresponding flat mating surface of the second buoyancy member thereby to form a float having an ogive-shaped nose at each end of the float for hydrodynamic performance,
    wherein the protrusions when assembled prevent a relative motion of the float with respect to the hose; and
    wherein the fastening means comprises a clip located on the outer surface of the first buoyancy member adapted to press-fit into an aperture located in the second buoyancy member.

2. The float of claim 1, wherein at least one of the buoyancy members comprises an air pocket to enhance floatation.

3. The float of claim 1, wherein the first and second members together define a hydro-dynamic shape when assembled around said hose.

4. A float for a hose, comprising:
    a first buoyancy member comprising a hollow chambered body having opposed first inner and first outer surfaces, said first inner surface defining a channel which is flanked by two flat mating surfaces, said channel for receiving a hose therein and bearing protrusions that are integral with the first inner surface and stand proud of the first inner surface, wherein the protrusions are of a size and shape so as not to penetrate an inner diameter of the hose when clamping an outer diameter of the hose;
    a second buoyancy member comprising a hollow chambered body having opposed second inner and second outer surfaces, said second inner surface defining a channel which is flanked by two flat mating surfaces, said channel for receiving said hose therein and bearing protrusions that are integral with the second inner surface and stand proud of the second inner surface, wherein the protrusions are of a size and shape so as not to penetrate an inner diameter of the hose but clamp an outer diameter of the hose; and
    fastening means for securing the first buoyancy member and the second buoyancy member together in a configuration in which each flat mating surface of the first buoyancy member abuts a corresponding flat mating surface of the second buoyancy member thereby to form a float having an ogive-shaped nose at each end of the float for hydrodynamic performance,
    wherein the protrusions when assembled prevent a relative motion of the float with respect to the hose; and
    wherein the fastening comprises complementary male and female formations formed on the first and second buoyancy members, respectively.

5. The float of claim 2, herein the air pocket is formed in the hollow chambered body.

6. The float of claim 4, wherein at least one of the buoyancy members comprises an air pocket to enhance floatation.

7. The float of claim 4, wherein the first and second members together define a hydro-dynamic shape when assembled around said hose.

8. The float of claim 6, wherein the air pocket is formed in the hollow chambered body.

* * * * *